United States Patent [19]

Breyer

[11] Patent Number: 4,664,156
[45] Date of Patent: May 12, 1987

[54] DEVICE FOR ISOLATING VIBRATIONS OF HEAVY EQUIPMENT

[75] Inventor: Werner Breyer, Lindau, Fed. Rep. of Germany

[73] Assignee: Lindauer Dornier Gesellschaft mbH, Lindau, Fed. Rep. of Germany

[21] Appl. No.: 815,986

[22] Filed: Jan. 3, 1986

[30] Foreign Application Priority Data

Jan. 31, 1985 [DE] Fed. Rep. of Germany ... 8502552[U]

[51] Int. Cl.[4] ............................................. D03D 49/00
[52] U.S. Cl. ...................................... 139/1 R; 248/562
[58] Field of Search ............ 139/1 R, 11 R; 248/562, 248/565

[56] References Cited

U.S. PATENT DOCUMENTS

| | | | |
|---|---|---|---|
| 2,210,051 | 8/1940 | Woodbury | 248/562 |
| 2,572,919 | 10/1951 | French et al. | 248/562 |
| 3,268,199 | 8/1966 | Kordyban et al. | 248/562 |
| 3,282,543 | 11/1966 | Engels | 139/1 R |
| 3,469,809 | 9/1969 | Reznick et al. | 139/562 |
| 3,509,742 | 5/1970 | Bauer | 248/562 |

Primary Examiner—Henry S. Jaudon
Attorney, Agent, or Firm—W. G. Fasse; D. H. Kane, Jr.

[57] ABSTRACT

Vibrations of heavy equipment, such as textile machinery, are isolated, that is prevented from entering into the supporting floor, by inserting a vibration isolating device between each equipment frame member forming a machine foot and the floor. The device includes a hydraulic damper and up to three sets of springs, preferably sets of concentrically arranged helical springs. The springs are mounted between upper and lower spring mounting elements. The spacing between these upper and lower mounting elements is adjustable by a threaded bolt for adapting the load bearing capacity of each set of springs to the respective machine foot load. Thus, individual springs in a set or an entire spring set may be withdrawn from a load bearing function for providing each machine foot, for example of a weaving machine, with the individually required vibration insulation at each machine foot.

9 Claims, 3 Drawing Figures

DEVICE FOR ISOLATING VIBRATIONS OF HEAVY EQUIPMENT

FIELD OF THE INVENTION

The invention relates to a device for isolating vibrations of heavy equipment such as textile machinery including weaving machines, to prevent the vibrations from entering a floor.

DESCRIPTION OF THE PRIOR ART

Where heavy equipment, such as heavy machinery, for example weaving machines, are secured to a machine floor in a factory, it is unavoidable that the operation of such equipment including looms and weaving machines causes vibrations and oscillations which are introduced into the machine floor.

Vibrations and oscillations of older machines having a relatively low operational speed, have not been much of a problem. However, modern weaving equipment operates at substantially higher machine r.p.m.s so that in recent years the resulting increase in vibrations and oscillations has received more and more attention. It has been found necessary to isolate these vibrations and oscillations so that they cannot enter into the machine floor and into the entire factory structure, because it has been noted that such vibrations and oscillations have become a nuisance to the environment. Thus, it has been observed that textile factories heretofore hardly had any difficulties regarding occurring vibrations as long as they were equipped with older machines. However, after new equipment operating at higher r.p.m.s had been installed, substantial vibration problems have been encountered because the vibrations caused by these new machines have not only increased the vibrations in the factory itself, they have been found to be a nuisance to the neighborhood. Thus, requirements have been established especially where a textile factory is located near residential areas, that the vibrations must be prevented from entering into the factory floor to thereby avoid the nuisance.

Thus, it is known to insert rubber elements between the textile machine such as a loom or weaving machine and the factory floor. Such rubber elements, however, permit only a relatively small static shock absorption so that these rubber elements are limited in their effectiveness for preventing the vibrations from entering into the machine floor. Further, machine movements that exceed a normally permissible limit, the limited operational life of such rubber vibration damping elements, and their small static "Einfederung" must be taken into account.

It is also known to employ so-called air springs for isolating vibrations of heavy equipment. However, such air springs require a source of compressed air and a respective conduit for connecting the air springs to the source of compressed air. Additionally, level adjustment valves are required so that such air springs involve a substantial effort and expense. Besides, even air springs are limited in their useful life because due to the heavy weight of the equipment involved, substantial sealing problems are encountered.

It is also known to use steel springs for isolating vibrations. Such steel springs have a good isolation effect and they provide a large static vibration damping once the initial spring stroke is dissipated. However, this very feature calls for relatively large springs which is not very desirable.

Another consideration that must be taken into account, especially in connection with textile equipment, is the fact that a machine having four feet applies four different loads to its four feet. This fact may even differ for different types of weaving machines and the fact may depend on different factors not just on different dimensions. As a result of these different load conditions at different machine feet, a different influence is exerted on the spring characteristic or vibration response characteristic of the springs at different machine feet. A calculation of the individual loads at individual machine feet is not possible because a four point bearing is involved, the center of gravity of which cannot be ascertained. Thus, it is necessary to look for different possibilities to solve the above outlined problems.

OBJECTS OF THE INVENTION

In view of the foregoing it is the aim of the invention to achieve the following objects singly or in combination:

to provide a possibility for adapting the load bearing capacity of the springs used at each machine leg to the individual load condition or conditions prevailing at the individual machine feet;

to avoid the difficulties of the prior art, more specifically, to provide a possibility of using smaller steel springs and to avoid the use of air springs altogether; and to provide a vibration isolation device which is adjustable so that one or several springs or spring packages can be made effective or withdrawn from being effective.

SUMMARY OF THE INVENTION

The vibration isolating device for heavy equipment is characterized according to the invention in that a hydraulic damper is installed between a base plate and an equipment frame member forming, for example, a machine foot. Further, at least one spring package is inserted between an upper and lower spring mounting member. The spring package preferably comprises a set of concentrically arranged helical springs located between disk shaped upper and lower mounting members. The spacing between the upper and lower spring mounting members is adjustable by a threaded bolt connecting the upper and lower mounting members for adapting the load carrying capacity of the springs to the load encountered at the individual machine foot.

In a basic embodiment of the invention the frame member forming a machine foot comprises a rectangular plate with attachment means for attaching a damper and three spring packages substantially to the corners of the plate. These three spring packages are independent of one another. Preferably, the foot forming plate comprises two flange sections and a central groove forming section in which a machine frame wall or the like is received. Thus, preferably, one damper such as a hydraulic damper, is combined with three spring packages or sets of springs which are adjustable independently of one another. By reducing the spacing between an upper spring mounting member and a lower spring mounting member of a set of springs it is possible to bias or tension the springs of the respective set and to lift the lower spring mounting member off the machine floor or off a base plate of the device, whereby the respective spring set is removed from being effective as such. Depending on the individual requirements at each individual machine foot it is thus possible to remove one spring or two springs or a set or sets of springs from being effective, whereby an easy adaptation to the individual loads at the respective machine foot is achieved.

When the sets of springs are used according to the invention, it is possible to remove individual springs from the set of springs in which the springs are arranged concentrically. In other words, each spring in a set of springs has a different diameter. In this manner it is further possible to adapt the load bearing capability or capacity of the set of springs to the individual machine foot loads. However, it may be altogether simpler to equip each device with the same number of springs and then remove one or more springs from the participation in the spring action by tightening a threaded bolt cooperating with a lower spring mounting member or members. Further, the individual springs of a set can be constructed to have different load bearing capacities, for example, by using different spring wire diameters. Thus, it is possible to provide a relatively fine, stepped adaptation of the spring load bearing capacity to the respective machine foot load. Since each device is normally equipped with three springs and, if needed, with a hydraulic damper, it is possible to remove one or two spring packages or sets of springs entirely from their effective status or to remove individual springs of a set from their effective status. Thus, assuming each set of springs comprises three springs, then the three sets of springs in a device will provide a substantial number of different combinations, and hence a very effective adaptation of the device to the individual load. Such adaptation is simply effected by tightening or loosening the adjustment bolt. If all springs of a set have been withdrawn from operation, it is also possible to remove the entire set from the device. The hydraulic damper, which as such is of known construction, is effectively connected in parallel to the spring or springs, whereby the movements of the spring supported machine frame or body are reduced. The damper introduces only relatively small forces into the machine floor, for example, through a screw connection by means of which the base plate is bolted to the machine floor. The damper in turn may be welded to the base plate. However, if at least one set of springs is mounted on the base plate of the damper, the damper is held in place on the floor by the compression force of the set of springs whereby an extra bolting becomes unnecessary.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
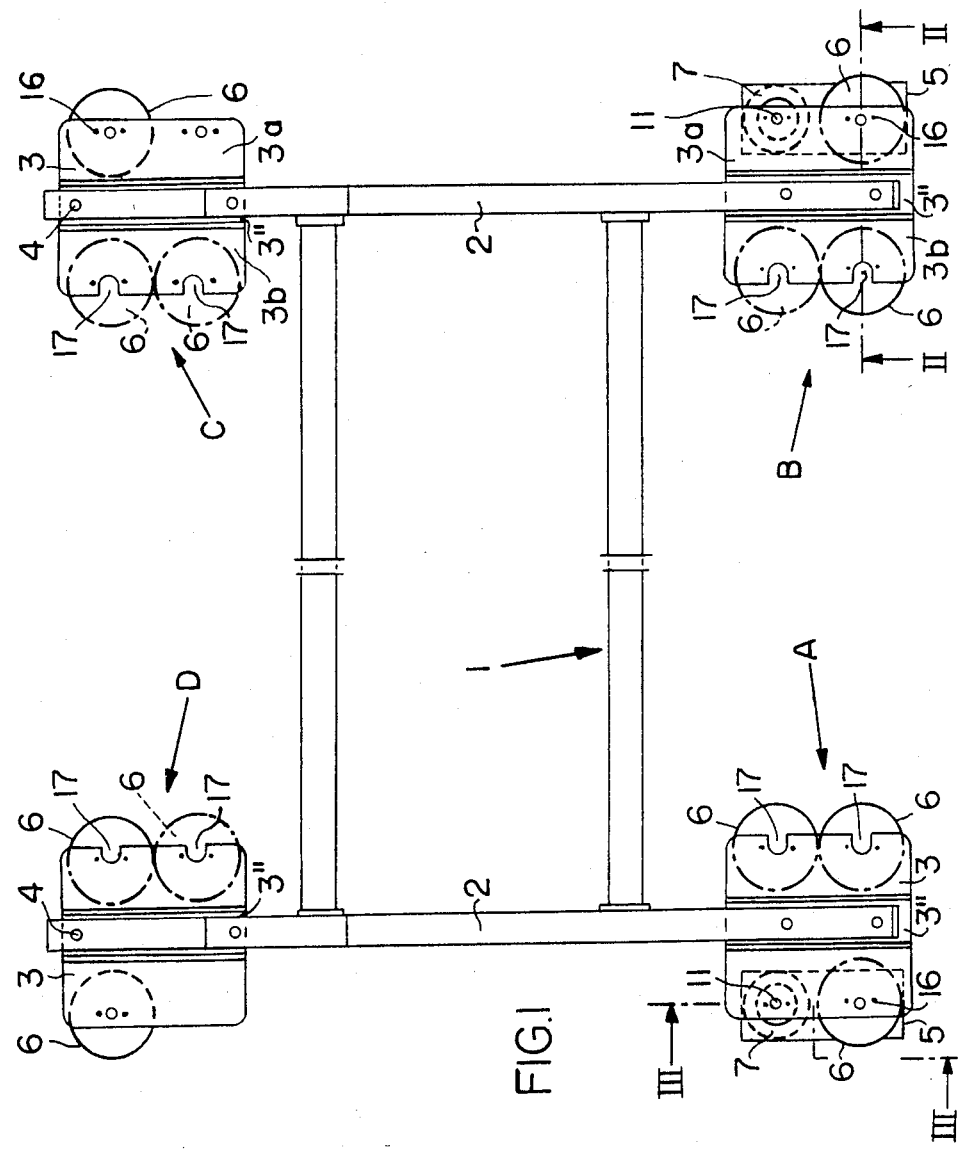
FIG. 1 is a top plan view of the frame components of a weaving machine having four feet, each of which can be equipped with an isolating device according to the invention.
Figure 3:
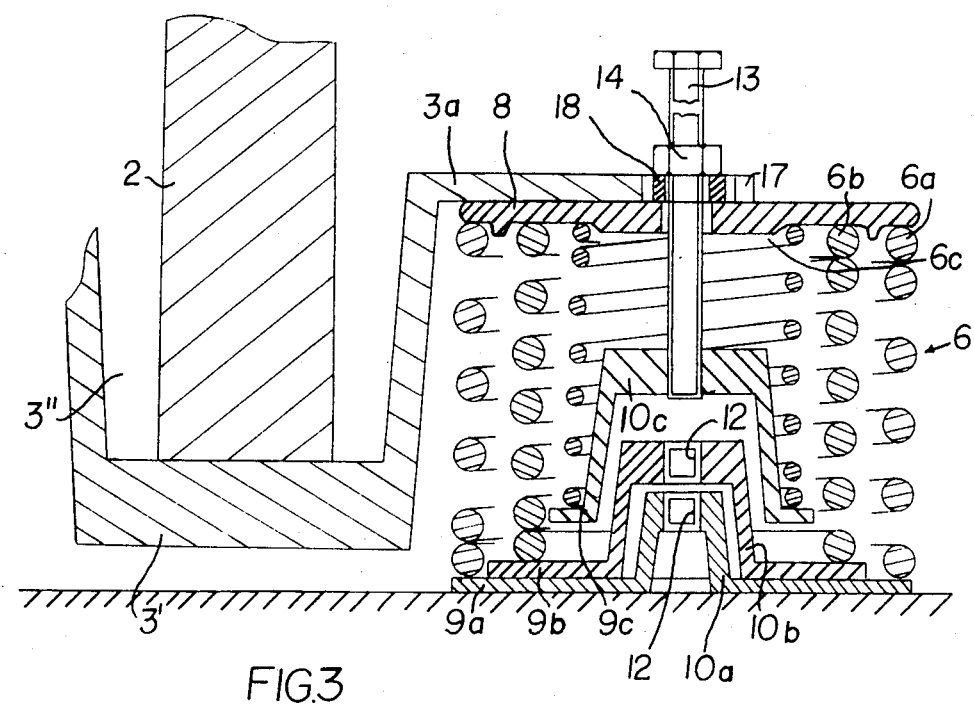
FIG. 3 is a sectional view along section line III—III in FIG. 1.

The top plan view of FIG. 1 illustrates, for example, a machine frame 1 of a weaving machine having lateral support frame members 2 constituting machine side walls. The ends of the side walls 2 are provided with machine feet A, B, C, and D. Each machine foot may comprise a device according to the invention, including a rectangular plate 3 having two flange sections 3a and 3b as well as a groove section 3' forming a groove 3" as best seen in FIG. 3. The side wall 2 is received in the groove 3" and connected to the machine foot, e.g. by screws 4.

According to the invention a machine foot A, B, C, and d is so constructed that it can hold or mount a complete vibration isolating device including a damper 7 and up to three sets 6 of springs. As shown for the feet A and B, the hydraulic dampers 7 are mounted on a base plate 5, for example, by welding as shown at 5' in FIG. 2. Additionally, the piston rod P of the damper 7 is secured to the respective flange section 3b, 3a by means of a mounting bolt 11 passing through an attachment hole in the respective flange section 3a or 3b. At least one set 6 of springs is also mounted between the base plate 5 and the plate 3 forming the machine foot. However, additional spring sets 6 may be used as shown in FIG. 1. For this purpose, the flange sections 3b, 3a are provided with attachment elements such as holes or cutouts 17, the latter being laterally open so that the respective set 6 of springs may be removed by loosening a mounting bolt 16 shown in FIG. 2. Although at least one set 6 of springs will be used at each foot, it is practical to provide several attachment positions with laterally open cutouts 17 in the flange sections 3a and 3b, whereby an entire spring set 6 may be removed at a location where it is not needed.

Figure 2:
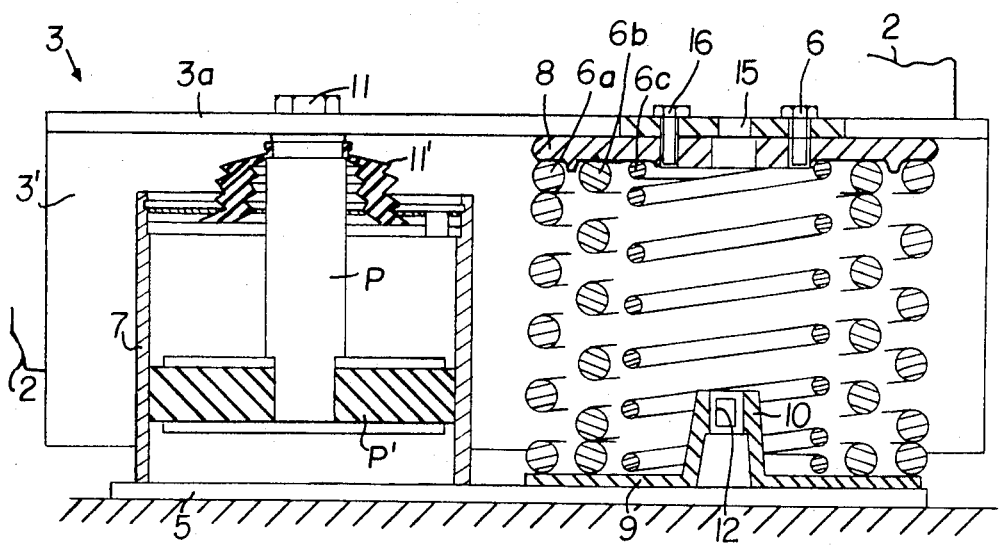
FIG. 2 is a partial sectional view along section II—II in FIG. 1.

FIG. 2 illustrates the conventional hydraulic damper 7 secured to the plate 3 through a screw bolt 11 reaching into a threaded hole of the damper piston rod P. Since the damper 7 is itself of conventional construction a further description is omitted. However, a flexible sleeve 11' protects the piston rod P carrying a piston P'.

Referring further to FIG. 2, a set 6 of springs is arranged adjacent to the damper 7. The set 6 comprises, for example, three helical springs 6a, 6b, and 6c arranged concentrically relative to each other. The individual springs may all be of the same construction or they may be constructed to have different spring characteristics which have been indicated by showing spring wires having different cross-sectional diameters. Thus, the springs shown in FIG. 2 will have different, individual bearing or support capabilities. The spring set 6 is mounted between a disk type upper mounting member 8 and a lower mounting member 9 also constructed as a disk type. The upper mounting member 8 is secured by screws 16 to the machine foot plate 3. The lower mounting member 9 rests loosely on the base plate 5. A threaded bolt 13, shown in FIG. 3, reaches through holes 15 in the foot plate 3 and in the upper mounting member 8 for cooperation with a threading hole 12 in a central portion 10 of the lower mounting member 9. The central portion 10 is preferably constructed as an upwardly raised bushing having a truncated conical sectional shape to provide space below the threading 12 for the lower end of the bolt 13 not shown in FIG. 2 but shown in FIG. 3. The bolt 13 holds the upper and lower mounting members 8, 9 together, whereby the springs are held in place during the mounting or assembly. Once the mounting is completed, the bolt 15 may be removed again and used only for adjustments of the spring bias if necessary. When it becomes apparent from the particular machine foot load that all originally provided three spring sets 6 are not necessary, then the bolt 13 may be threaded into the threaded hole 12 for reducing the spacing between the upper mounting member 8 and the lower mounting member 9 unti lthe lower mounting member 9 is lifted off the base plate 5. Thereafter, the spring set which is not necessary can be removed in its tightened or biased state from the device.

However, as mentioned above, it is also possible to remove just one or two individual springs out of a set of three or more springs. For this purpose the spring set 6 is first removed from the device whereupon a spring 6a or 6b, or 6c is removed or several springs are removed, whereupon the remaining spring or springs are again installed into the device as described above, with the aid of the lateral cutouts 17.

The embodiment of FIG. 3 illustrates a modification of the lower mounting means for the spring set. As mentioned, the foot plate 3 has two flange sections 3a, 3b of which only the flange section 3a is shown in FIG. 3, which also shows the central section 3' forming the groove 3" for receiving the frame or side wall 2. The spring set of package 6 again comprises, for example, three concentrically arranged helical springs 6a, 6b, and 6c. By showing different spring wire diameters for each spring, it is intended to indicate that each helical spring has different bearing characteristics. The lower mounting means comprise three lower mounting members 9a and 9b and 9c. Each of these members has a central portion, preferably a conical portion 10a, 10b, and 10c provided with the respective female threaded hole 12. The conical portions 10a, 10b, 10c are so dimensioned that they can be nested within one another as shown. The diameters of the disk portions of the lower mounting members 9a, 9b, 9c are adapted to accommodate the respective helical spring 6a, 6b, 6c. When the adjustment nut 14 is loosened, the threaded bolt 13 may engage one, two, or three of the lower mounting members. A spacer ring 18 provides a proper bearing surface for the adjustment nut 14.

FIG. 3 illustrates the case in which the threaded bolt 13 engages the threaded hole 12 of the conical portion 10c of the lower mounting member 9c, thereby lifting the lower mounting member 9c off the next adjacent lower mounting member 9b. Thus, the innermost helical spring 6c is subjected to tension and removed from an effective status. As a result, only two springs, namely 6a and 6b, continue to be effective. By threading the bolt 13 also into the central portion 10b the spring 6b may also be made ineffective. The same applies to spring 6a, if necessary. Accordingly, a stepwise adjustment or adaptation of the spring bearing capacity is possible to take the individual machine foot load into account. It will be appreciated, that this adjustment is rather simple by the just described simple means. By providing the above mentioned laterally opened cutout 17 in the foot plate 3, it is possible to even remove the entire set 6 of springs from its effective position between the foot plate 3 and the base plate 5 or the machine floor.

By a trial and error approach it is possible to relatively quickly determine the individual machine foot loads at the feet A, B, C, and D, whereupon the spring sets not required for an effective vibration isolation, are taken out of their effective position or, individual springs within a set are made ineffective as described. For example, the following load situation could be assumed for FIG. 1. Machine foot A requires two complete sets 6 of springs and an adapted set of springs. Machine foot B requires two complete sets of springs. Machine foot C requires only one adapted set of springs. Machine foot D requires two adapted sets of springs. The spring sets which are not required are indicated only in their positon by a dash-dotted line in FIG. 1. FIG. 1 further indicates that, for example, at the machine feet C and D, dampers 7 are also not necessary under certain circumstances where an extra parallel damping is not needed.

In any event, the required load bearing capability of the spring sets may be adjusted in very fine steps for each machine foot so that the static condition of all the springs after the initial spring excursion has been dissipated, is substantially the same for each of the four feet, whereby a good vibration isolation is achieved.

Further, although the disclosure refers specifically to textile machines and to weaving machines, the present device with its combination of a hydraulic damper with several sets of springs is universally useful for the described purpose since its bearing capability is adjustable within a wide range.

Although the invention has been described with reference to specific example embodiments, it will be appreciated, that it is intended to cover all modifications and equivalents within the scope of the appended claims.

What I claim is:

1. A device for isolating vibrations of heavy equipment having an equipment frame member, especially textile machinery, comprising a base plate (5) for supporting said frame member (2, 3) on a machine floor, hydraulic damping means (7) operatively interposed between said frame member (2, 3) and said base plate (5), at least one set (6) of a plurality of helical springs (6a, 6b, 6c) arranged in a concentric package located between said frame member and said base plate, said set of springs comprising upper spring mounting means (8) and lower spring mounting means (9) for mounting said helical springs between said frame member and said base plate, threaded hole means and a threaded bolt engaging said threaded hole means for operatively interconnecting said upper and lower spring mounting means for adjusting a spacing between said upper and lower spring mounting means and thus the spring tension.

2. The device of claim 1, further comprising securing means (16) for releasably attaching said upper spring mounting means to said frame member (2, 3),s aid lower spring mounting means (9) resting loosely on said base plate for said adjusting of said spacing.

3. The device of claim 1, wherein said frame member is a machine foot having two flange sections and a groove section between said flange sections for supporting said equipment in said groove section, said flange sections comprising attachment means for attaching said hydraulic damping means to said one of said flange sections and for attaching said set of springs also to said flange sections.

4. The device of claim 3, wherein said two flange sections form a substantially rectangular plate, said groove section extending substantially centrally in said rectangular plate, said attachment means being located near each corner of said rectangular plate, said apparatus comprising three sets of said helical springs, each set of springs being attached near a corner of said rectangular plate, said hydraulic damping means being secured near the fourth corner of said rectangular plate.

5. The device of claim 1, wherein said upper and lower spring mounting means comprises respective upper and lower spring mounting disks.

6. The device of claim 5, wherein each of said plurality of helical springs has a different load bearing capacity.

7. The device of claim 1, wherein said lower spring mounting means comprise a separate lower spring mounting member for each helical spring, each lower mounting member having a diameter adapted to the diameter of its respective helical spring, each lower mounting member further having a central portion with a central threaded hole for threaded cooperation with said threaded bolt for said adjusting of said spacing.

8. The device of claim 7, wherein each of said threaded central portions comprises a conical bushing, said conical bushings having different sizes so that the conical bushings can be nested one in the other.

9. The device of claim 8, wherein each bushing has a central threaded hole, said threaded bolt passing through said frame member and through said upper spring mounting means for cooperation with any one or all of said central threaded holes.

* * * * *